(12) United States Patent
Gardner

(10) Patent No.: US 7,990,848 B1
(45) Date of Patent: Aug. 2, 2011

(54) SYSTEM AND METHOD FOR LONG HAUL OPTICAL PROTECTION FOR STORAGE AREA NETWORK (SAN) TRANSPORT

(75) Inventor: James A. Gardner, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1157 days.

(21) Appl. No.: 11/290,705

(22) Filed: Nov. 30, 2005

(51) Int. Cl.
*G01R 31/08* (2006.01)
*H04L 12/28* (2006.01)

(52) U.S. Cl. ......... 370/216; 370/228; 370/389; 370/400

(58) Field of Classification Search .......... 370/216–223, 370/225, 351, 389, 390, 400, 401; 398/1–7, 398/41–43, 45, 57, 68–70; 710/15, 18, 38; 714/1, 4, 42; 709/238, 239
See application file for complete search history.

(56) References Cited

U.S. PATENT DOCUMENTS

| | | | |
|---|---|---|---|
| 7,126,908 B1 * | 10/2006 | Lu et al. ..................... 370/228 |
| 7,274,869 B1 * | 9/2007 | Pan .............................. 398/5 |
| 7,428,214 B2 * | 9/2008 | Nosella ........................ 370/228 |
| 2003/0016409 A1 * | 1/2003 | Shah ............................ 359/110 |
| 2003/0058880 A1 * | 3/2003 | Sarkinen et al. ............. 370/413 |
| 2004/0126057 A1 * | 7/2004 | Yoo ................................ 385/16 |
| 2004/0218531 A1 | 11/2004 | Cherian et al. |
| 2005/0201323 A1 * | 9/2005 | Mani et al. ................... 370/328 |
| 2006/0203720 A1 * | 9/2006 | Kano ............................ 370/228 |
| 2008/0285440 A1 * | 11/2008 | Adler ........................... 370/223 |
| 2009/0129771 A1 * | 5/2009 | Saniee et al. .................. 398/3 |

OTHER PUBLICATIONS

U.S. Appl. No. 11/207,312, filed Aug. 19, 2005.

* cited by examiner

*Primary Examiner* — Kwang B Yao
*Assistant Examiner* — Jutai Kao

(57) ABSTRACT

Disclosed is a method and system by which a high level of network availability is provided to a storage area network. The method and system transmit data over a storage area network from a source to a destination. A first and second path are configured from the source to the destination. Additional paths between the source and destination are created by connecting a first mid-span switch on the first path to a second mid-span switch on the second path. Additionally, the same data is multicasted over two (or more) of the paths (e.g., on different wavelength channels).

20 Claims, 3 Drawing Sheets

SYSTEM AND METHOD FOR LONG HAUL OPTICAL PROTECTION FOR STORAGE AREA NETWORK (SAN) TRANSPORT

CROSS REFERENCE TO RELATED APPLICATIONS

This application is related to commonly assigned patent application Ser. No. 11/207,312 filed Aug. 19, 2005, entitled "Method and System for Long Haul Optical Transport for Applications Sensitive to Data Flow Interruption", which is incorporated herein by reference.

BACKGROUND OF THE INVENTION

The present invention relates generally to storage area networks, and more particularly to long haul optical protection using mid-span switches in a Storage Area Network (SAN).

Businesses are becoming increasingly reliant on computer networks for mission critical applications. With the emergence of the Internet and the proliferation of global e-business applications, more and more organizations are implementing computing infrastructures specifically designed for reliably accessible data and system availability. Today, even applications such as e-mail have become critical for ongoing business operations.

Faced with increased customer and internal user expectations, organizations are currently striving to achieve the highest availability in their computing systems. Any downtime during mission critical applications can severely impact business operations and cost valuable time, money, and resources. To ensure the highest level of system uptime, organizations are implementing, for example, reliable storage area networks capable of boosting the availability of data for all the users and applications that need it. These organizations typically represent the industries that demand the highest levels of system and data availability, for example, the utilities and telecommunications sector, brokerages and financial service institutions, and a wide variety of service providers.

Developing highly available networks involves identifying specific availability requirements and predicting what potential failures might cause outages. In designing these networks, designers must first understand and define their availability objectives—which can vary widely from one organization to another and even within segments of the same organization. In some environments, no disruption can be tolerated while other environments might be only minimally affected by short outages. As a result, availability is relative to the needs of an application and a function of the frequency of outages (caused by unplanned failures or scheduled maintenance) and the time to recover from such outages.

One of the challenges of building an optical network is building in these availability objectives and characteristics, given the long spans of optical fiber used, for example, in long haul networks. Typically, what is utilized is the construction of multiple diversity routed spans of optical fiber. Despite these redundancy measures and monitoring techniques used, there is no escaping the reality that the frequency of switch-to-protect events (i.e., the switching of data transmission paths due to a failure on one of the paths) increases with increasing transport distance.

Optical networks are mature, robust transport mechanisms for general data applications. With careful attention to network architecture, optical protection switching mechanisms enable the construction of a network with no single point of failure.

However, these protection switches, though infrequent, involve a brief loss of data transmission continuity. In voice or general data applications, this has been generally acceptable. In more recent data applications, such as high speed optical networks used with mission-critical applications, these brief, infrequent protection switching events may bring about a halt in the application, and possibly require lengthy data resynchronization activity before the application is restarted.

Although connectionless packet transport networks are less sensitive to brief interruptions in transport continuity due to sophisticated routing mechanisms, they remain a source for network failure. Connectionless transport can potentially have large, unavoidable variations in latency. These same applications that are sensitive to data transport continuity are also sensitive to latency variations.

In implementing long haul high speed networks, network designers now consider network availability of primary importance over the costs associated with the implementation and operation of the network. For high volume networks, any downtime may mean the loss of millions of dollars.

To achieve these very high levels of performance in a high speed network requires a combination of a low failure rate and a very short recovery time whenever a failure occurs. For the most part, current protection and disaster recovery schemes make use of physical redundancy and an array of robust software-based recovery mechanisms. Physical redundancy has traditionally been achieved by provisioning redundant backup subsystems having substantially the same network elements as the primary network. In effect, the primary networks are mirrored in the backup subsystem. In the event of a network failure, network elements such as switches and routers provide alternate and diverse routes on a real-time or predetermined basis. In tandem, software-based recovery schemes complement physical redundancy in minimizing the impact of interrupted customer traffic. Recovery software enhances network availability by automating the recovery process so as to ensure the fastest failover possible. At times, failovers may occur so quickly that they appear transparent to the customer.

There are several high availability strategies in use today. Among these strategies are protective and restoration schemes based on centralized or distributed execution mechanisms, the priority of data, the network layer in which a failure occurs, link or node failures and real-time or pre-computed failure responses. In one protective strategy, backup resources are allocated on a one-for-one basis in advance of any network failure and regardless of the added expense or the inefficient use of available resources. In another protective strategy, available and previously unassigned resources are immediately allocated and used on a real-time or on a substantially real-time basis, at the expense of recovery speed.

Dedicated use of network resources is a protective scheme currently used in network management. In the dedicated protective strategy, certain network resources are dedicated as backup network elements for use upon the failure of the primary communications channel. Backup resources such as backup switches, routers, servers, controllers, interfaces, drives, and links are dedicated as backup to the primary network elements. In the early development of the networking industry, this strategy was referred to as a "hot standby" mode of operation. Upon the detection of a failure of a network element, its corresponding backup network elements were immediately placed in operation. In the event of a failure, data being transmitted on the primary pathway is alternately routed through the backup pathway. In this protective approach to network availability, the backup pathway remains idle, but is immediately made available to data on the primary pathway. As readily apparent, the provisioning of a fully redundant and diverse route adds considerable expense to the installation and operation of the high speed network. Moreover, the physical switching of pathways may result in a disruption long enough to bring down a system.

In the optical networking industry, storage area networks (SANs) have used these same protective strategies, with less than acceptable availability performance. A SAN is a network whose primary purpose is the transfer of data between and among computer systems and storage elements. A SAN consists of a communication infrastructure, which provides physical connections, and a management layer, which organizes the connections, storage elements, and computer systems so that data transfer is secure and data is highly available. A major advantage of SANs is the ability to provide any-to-any connectivity between the storage devices and remote computers. This means that multiple computer systems can share a storage device so as to allow for the consolidation of storage devices into one or a few centrally managed platforms. SANs employ fibre channel technology to provide 100 Mbs or better data transfer speeds which is significantly faster than today's Small Computer System Interface (SCSI) (i.e., a parallel interface enabling computers to communicate with peripheral hardware such as printers). At these speeds, SANs are used to perform backup and recovery functions, such as data replication, clustering, and mirroring. However these functions are quite sensitive to data disruption and may also be susceptible to the briefest of network failures.

The disruption frequency increases as the length at which the data is being transported increases. The time needed to synchronize the two endpoints (i.e., the source and destination) after a failure on a high volume data channel occurs can be hours.

Also, the amount of fiber needed for a long haul circuit can be extremely expensive in terms of materials and the labor associated with putting the fiber down. As a result, replication of one or more data channels (i.e., fibers) for use as backup is often an expensive undertaking.

Thus, there remains a need to provide an optical network that minimizes data disruption and also reduces the amount of fiber needed for backup data channels when transporting data over long distances.

BRIEF SUMMARY OF THE INVENTION

The present invention provides a method and system by which a high level of network availability is provided to a storage area network. The method and system transmit data over a storage area network from a source to a destination. A first and second path are configured from the source to the destination. Additional paths between the source and destination are created by connecting a first mid-span switch on the first path to a second mid-span switch on the second path. Additionally, the same data is multicasted over two (or more) of the paths (e.g., on different wavelength channels).

In one embodiment, Dense Wavelength Division Multiplexing (DWDM) devices are in communication with the first or second mid-span switches. In one embodiment, the destination end switch selects a path on which data is received. This selection process may be based on an arbitration process.

The mid-span switches may also switch the path used to transmit the data when a failure on a path is determined or recognized.

These and other advantages of the invention will be apparent to those of ordinary skill in the art by reference to the following detailed description and the accompanying drawings.

DETAILED DESCRIPTION

Figure 1:
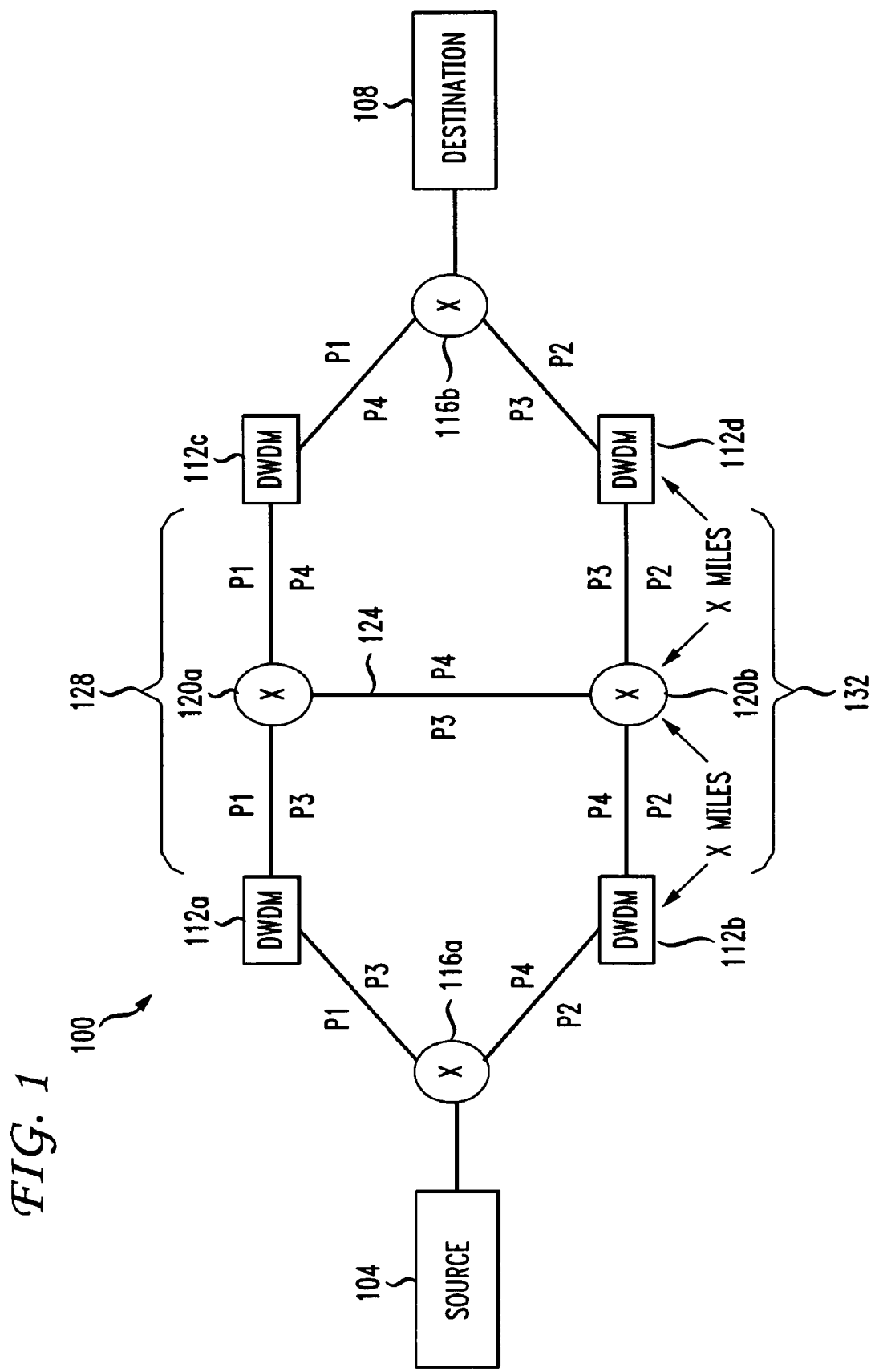
FIG. 1 shows a block diagram of a storage area network (SAN) having mid-span switches in accordance with an embodiment of the invention.

FIG. 1 shows a block diagram of a storage area network (SAN) 100 functioning as a high speed transport of data from a source 104 (e.g., an Optical Carrier Level of 48 (i.e., OC-48)) to a destination 108. The optical network 100 includes two diversely routed Dense Wavelength Division Multiplexing (DWDM) circuits with DWDM devices 112a, 112b, 112c, 112d (generally 112). A DWDM device is an optical processing device responsible for receiving and/or transmitting or otherwise processing optical signals.

The two DWDM devices 112a, 112b are connected to a source end switch 116a. The source end switch 116a receives and transmits data from various source side network elements (e.g., 104) preferably in optical form. If necessary, electrical data may be converted to optical data in switch 116a.

The two DWDM devices 112c, 112d are connected to a destination end switch 116b (the two end switches 116a, 116b are also generally referred to below as end switch 116). The destination end switch 116b receives and transmits data from various destination side network elements (e.g., 108) preferably in optical form. If necessary, electrical data may be converted to optical data in switch 116b.

Each switch 116 may switch other on-board electrical signals. Switch 116 may take the form of a router, Ethernet switch, or SAN switch or any other network element (NE) capable of providing optical input data to any of the DWDM devices 112. Switches 116 may, depending on their function and on the requirements of the connecting network, include a programmable processor/controller, memory storage, cross-connect, wavelength converter, processing software including arbitration and event correlation modules, and a variety of interface modules for communicatively connecting switches 116 to the optical network and their respective source or destination. Additionally, each switch 116 may have 1+1 (or 1+N) card protection, meaning that each switch may have one or more backup cards (or modules) for each "live" card (or module) so that the switch can continue operations even if a fault occurs in one of the "live" cards/modules. Thus, each switch 116 has built in fault tolerance.

The optical network 100 also includes mid-span switches 120a, 120b (generally 120). A mid-span switch is an active switch that is positioned in between two other components of a SAN and separated from each component by a predetermined distance. The mid-span switches 120 are switches located a particular distance from each DWDM equipment device 112 (shown as X miles away from each DWDM equipment device 112). In one embodiment, X miles is between approximately 50 miles and 400 miles. The mid-span switches 120 are connected to each other via cross-over fiber 124. Cross-over fiber 124 bridges the two data channels connecting the respective DWDM devices 112. The mid-span switches 120 may also have 1+1 card protection.

Cross-over fiber 124 thereby enables the transmission of data from the source 104 to the destination 108 via four pathways. Each pathway is a physical path along at least some of one or more data channels (e.g., data channel 128 or data channel 132). Each data channel is one or more fibers that make up the transmission route from one location (e.g., the source 104) to another location (e.g., the destination).

The first pathway P1 is from the source 104 to the source end switch 116*a* to the source DWDM equipment device 112*a* to mid-span switch 120*a* to the destination DWDM equipment device 112*c* to the destination end switch 116*b* to the destination 108. The second pathway P2 is from the source 104 to the source end switch 116*a* to the source DWDM equipment device 112*b* to the mid-span switch 120*b* to the destination equipment device 112*d* to the destination end switch 116*b* to the destination 108. The third pathway P3 is from the source 104 to the source end switch 116*a* to the source DWDM equipment device 112*a* to the mid-span switch 120*a* to the cross-over fiber 124 to the mid-span switch 120*b* to the destination DWDM equipment device 112*d* to the destination end switch 116*b* to the destination 108. The fourth pathway P4 is from the source 104 to the source end switch 116*a* to the source DWDM equipment device 112*b* to the mid-span switch 120*b* to the cross-over fiber 124 to the mid-span switch 120*a* to the destination DWDM equipment device 112*c* to the destination end switch 116*b* to the destination 108.

To eliminate protection event interruption (i.e., the switching to a new data channel and the synchronization associated with the new data channel typically done after another data channel fails), the same data is transported on two different paths (e.g., paths P1 and P2). If one of the paths fail (e.g., P1), the source end switch 116*a* selects one of the two remaining paths (e.g., P3 or P4) such that there are always two paths through the network carrying the data (e.g., P1 and P3 or P1 and P4). When the data is traveling on paths P1 and P3, for example, the data is being transmitted on different wavelength channels such that transmission on P1 and P3 between the source DWDM equipment device 112*a* and mid-span switch 120*a* can occur simultaneously.

A failure of a path may occur from a physical cutting of a data channel. For example, path P1 may be cut between the source DWDM equipment device 112*a* and the mid-span switch 120*a*. In one embodiment, if data was being transmitted from source 104 to destination 108 using paths P1 and P2, and if P1 is cut, the source end switch 116*a* may recognize that data is no longer being transmitted over P1 to the mid-span switch 120*a*. The source end switch 116*a* then switches to path P4, thereby transmitting the data over paths P2 and P4. Alternatively, the switches (e.g., end switch 116*a* or mid-span switch 120*a*) can be controlled/switched by a user when the user recognizes or is notified of a fault. Thus, the switches enable active switching to occur when a failure is recognized so that the storage area network 100 is more fault tolerant.

If the channel between the mid-span switch 120*a* and the destination DWDM switch 112*c* fails (e.g., is accidently cut or broken), the mid-span switch 120*a* may recognize the failure and switch to using path P3 to transmit the data to the destination end switch 116*b* (and to the destination 108). If path P3 between the mid-span switch 120*b* and the destination DWDM equipment device 112*d* fails, then mid-span switch 120*b* may then switch to P4. There is no switch-to-protect time required in the SAN 100 because no additional time is needed to synchronize new paths between the source 104 and destination 108.

Further, as SAN applications are latency sensitive, in one embodiment the paths through the network are prioritized in a particular (e.g., ascending) order. Specifically, the paths may be prioritized from least latency to longest latency. If the longer path(s) exceed the latency requirements of the storage application (of the source 104), the longer path(s) may be excluded after assuring that doing so does not create a single point of failure.

In one embodiment, the source 104 transmits data over two paths using different wavelength channels for each path. The destination end switch 116*b* receives, stores, and buffers received data from the wavelength channels associated with the two paths but only forwards data received from one of the paths to the destination 108. In the event of a path (or wavelength channel) failure, destination end switch 116*b* selects another path (or wavelength channel) through an arbitration process.

Selection of the wavelength channel requires the use of a means for separating light into its various wavelengths. In the present invention, there are a myriad of technologies which could be used to select and process a selected wavelength, including, but not limited to, various forms of demultiplexing and optical filtering. Because DWDM transport systems send signals from several sources over a single fiber, the DWDM devices generally include optical multiplexers and demultiplexers for combining and separating the transported signals and operating in a unidirectional or bidirectional mode.

Figure 2:
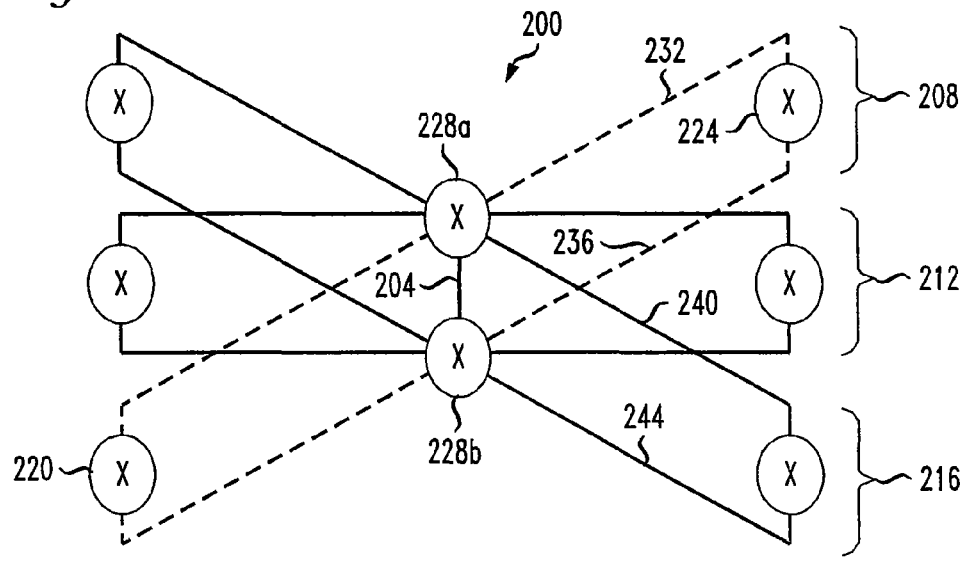
FIG. 2 shows a block diagram of a storage area network having multiple long haul circuits sharing mid-span switches.

FIG. 2 shows a block diagram of a SAN 200 having multiple long haul circuits protected by a single cross-over fiber 204. FIG. 2 does not show the DWDM devices for clarity. The SAN 200 includes three independent long-haul circuits 208, 212, 216. Each circuit 208, 212, 216 has two end switches (e.g., source end switch 220 and destination end switch 224 of circuit 208), as described above. Further, all three of the circuits 208, 212, 216 utilize a first mid-span switch 228*a* and a second mid-span switch 228*b* (generally 228) connected by fiber 204. Thus, the three circuits 208, 212, 216 share the use of the mid-span switches 228 and the use of the fiber 204. This configuration saves expenses associated with fiber and with switches because the shared fiber 204 and the shared mid-span switches 228 are shared among the three circuits 208, 212, 216.

The crossover fiber 204 does not require one-for-one capacity with all of the fibers that it is protecting. For example, if fiber section 232 fails, the mid-span switch 228*a* uses the crossover fiber 204 to send the data along fiber section 236. Similarly, if fiber section 240 fails, the mid-span switch 228*a* uses the crossover fiber 204 to send the data along fiber section 244. Thus, the mid-span switches 228 and the crossover fiber 204 can be shared among a plurality of circuits.

Figure 3:
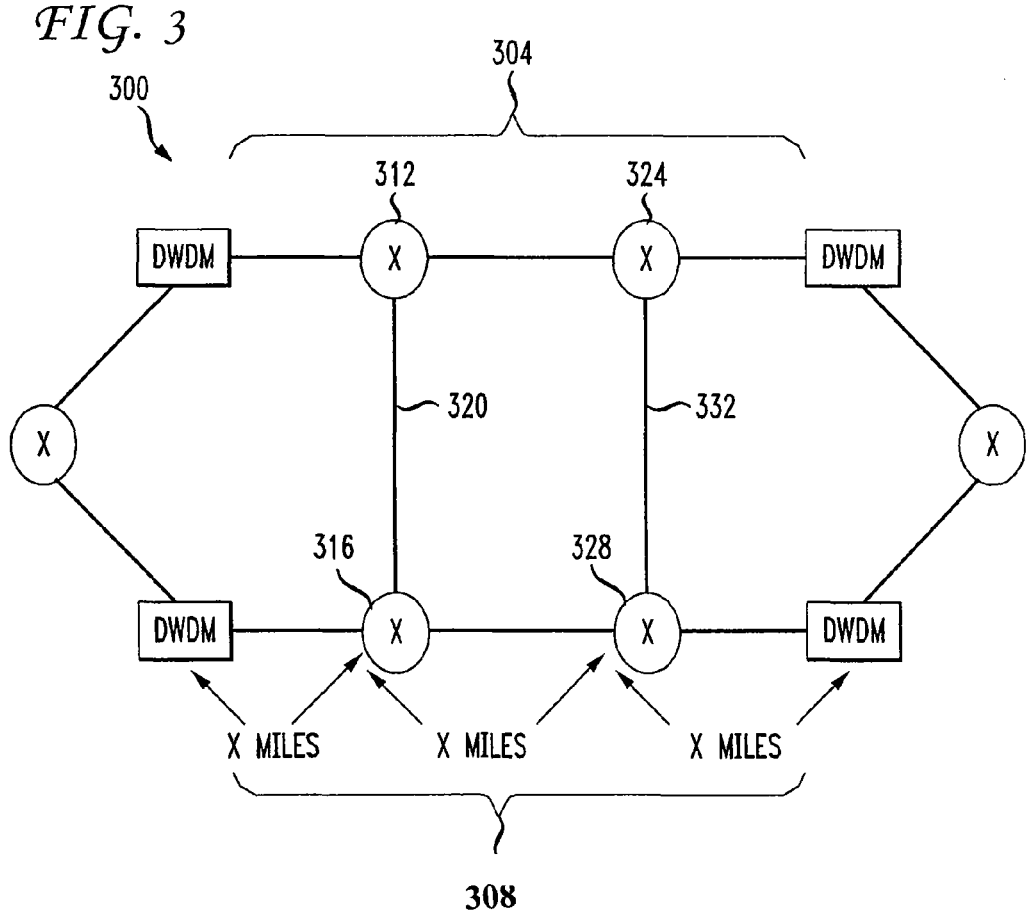
FIG. 3 shows a block diagram of a storage area network having several mid-span switches in accordance with an embodiment of the invention.

FIG. 3 shows a block diagram of a SAN 300 having multiple pairs of mid-span switches. The SAN 300 includes two mid-span switches on each data channel. In particular, the SAN 300 has a first data channel 304 and a second data channel 308. The first data channel 304 has a first mid-span switch 312 connected to a second mid-span switch 316 on the second data channel 308 via fiber 320. The first data channel 304 also has a third mid-span switch 324 connected to a fourth mid-span switch 328 on the second data channel 308 via fiber 332. These mid-span switches 312, 316, 324, 328 are each located X miles away from the next component of the SAN, such as from another mid-span switch or from a DWDM equipment device as shown. The fibers may be dedicated or shared.

In one embodiment, the network is a packet-based network such as a MultiProtocol Label Switching (MPLS) network. In this embodiment, the switches (i.e., the end switches or the mid-span switches) may be routers.

Figure 4:
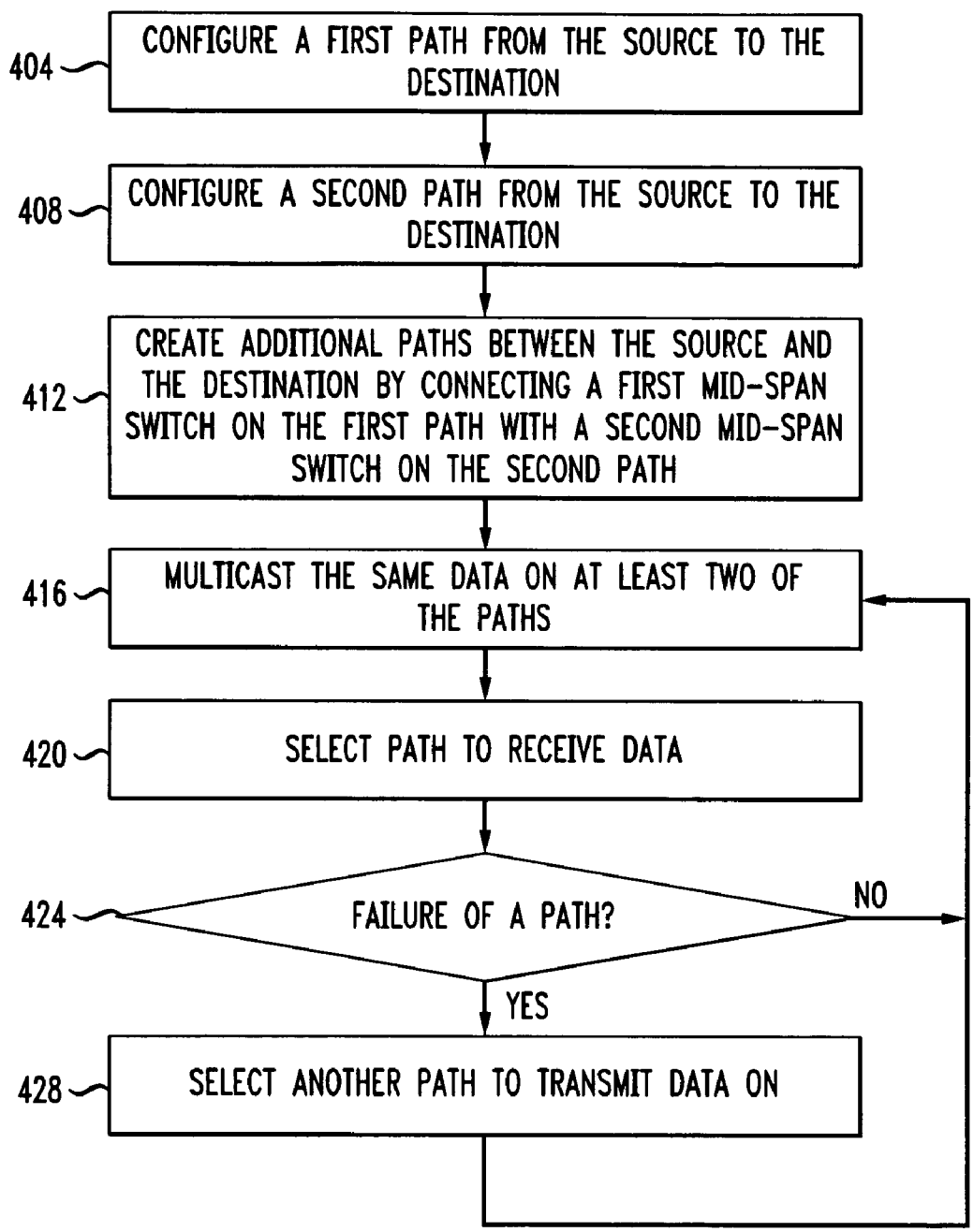
FIG. 4 is a flow chart illustrating the steps performed to create multiple paths in a storage area network.

FIG. 4 shows a flow chart illustrating the steps performed to create multiple paths in a storage area network. A first path is configured from the source to the destination in step 404. A second path is configured from the source to the destination in step 408. Additional paths are created between the source and the destination by connecting a first mid-span switch on the first path with a second mid-span switch on the second path via a crossover fiber in step 412. An end switch (e.g., the source end switch) then multicasts the same data over two (or more) paths of the storage area network simultaneously. The destination end switch then selects a path on which to receive the data in step 420. If a failure occurs on one or more of the paths in step 424, the source end switch or a mid-span switch selects another path in step 428 to transmit the data on in step 416. There is, therefore, no single point of failure as the data is always being transmitted over two separate paths.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A system for transmitting data over a storage area network from a first source to a first destination and from a second source to a second destination, comprising:
    a first path from the first source to the first destination;
    a second path from the first source to the first destination, the first and second paths comprising a first long-haul circuit;
    a third path from the second source to the second destination;
    a fourth path from the second source to the second destination, the third and fourth paths comprising a second long-haul circuit;
    a first mid-span switch on the first path and on the third path, connected to a second mid-span switch on the second path and the fourth path via a single shared connection, the single shared connection creating a plurality of additional paths between the first source and the first destination and a plurality of additional paths between the second source and the second destination, the first long haul circuit being otherwise independent from the second long haul circuit, and the first and second long-haul circuits being otherwise independent from the single shared connection;
    a first end switch multicasting over at least one of the first path and the second path, and at least one of the plurality of additional paths between the first source and the first destination; and
    a second end switch multicasting over at least one of the third path and the fourth path, and at least one of the plurality of additional paths between the second source and the second destination.

2. The system of claim 1 further comprising Dense Wavelength Division Multiplexing (DWDM) devices in communication with the first mid-span switch.

3. The system of claim 1 further comprising Dense Wavelength Division Multiplexing (DWDM) devices in communication with the second mid-span switch.

4. The system of claim 1 wherein the first end switch transmits the same data from the first source.

5. The system of claim 1 further comprising a first destination end switch for receiving the data.

6. The system of claim 5 wherein the first destination end switch selects data from one of the first path, the second path, and one of the plurality of additional paths between the first source and the first destination using an arbitration process.

7. The system of claim 1 wherein the first and second mid-span switches switch the path used to transmit the data.

8. The system of claim 7 wherein the first and second mid-span switches switch the path upon a failure of another path.

9. The system of claim 1 wherein the shared connection is a shared crossover fiber.

10. The system of claim 1 wherein the plurality of additional paths between the first source and the first destination further comprise a fifth path and a sixth path.

11. The system of claim 2 wherein the first mid-span switch is located a predetermined distance away from the DWDM devices.

12. The system of claim 3 wherein the second mid-span switch is located a predetermined distance away from the DWDM devices.

13. The system of claim 1 wherein the storage area network is a packet-based network.

14. The system of claim 1 further comprising a plurality of mid-span switches on the first path.

15. The system of claim 1 further comprising a plurality of mid-span switches on the second path.

16. A method for transmitting data over a storage area network from a first source to a first destination via a first long-haul circuit comprising at least one of a first path and a second path, and at least one of a plurality of additional paths from the first source to the first destination, and for transmitting data over the storage area network from a second source to a second destination via a second long-haul circuit comprising at least one of a third path and a fourth path, and at least one of a plurality of additional paths from the second source to the second destination, comprising:
    transmitting data via at least one of the first path and the second path from the first source to the first destination;
    transmitting data via at least one of the third path and the fourth path from the second source to the second destination;
    if a failure occurs on one of the first, second, third and fourth paths, switching, by a first mid-span switch on the first and third paths or a second mid-span switch on the second and fourth paths, the failed path to one of the plurality of additional paths, the plurality of additional paths formed via a single shared connection between the first mid-span switch and the second mid-span switch, the first long haul circuit being otherwise independent from the second long haul circuit, and the first and second long-haul circuits being otherwise independent from the single shared connection;
    transmitting the data from the first source to the first destination via the at least one of the plurality of additional paths between the first source and the first destination; and
    transmitting the data from the second source to the second destination via the at least one of the plurality of additional paths between the second source and the second destination.

17. The method of claim 16 further comprising using Dense Wavelength Division Multiplexing (DWDM) devices in communication with the first mid-span switch.

18. The method of claim 16 further comprising using Dense Wavelength Division Multiplexing (DWDM) devices in communication with the second mid-span switch.

19. The method of claim 16 further comprising selecting data from one of the path, the second path, and one of the plurality of additional paths between the first source and the first destination using an arbitration process.

20. The method of claim 16 wherein the switching of the path further comprises being notified of the failure.

* * * * *